United States Patent
Wen et al.

(10) Patent No.: US 10,517,020 B2
(45) Date of Patent: Dec. 24, 2019

(54) MOBILE EDGE PLATFORM SERVERS AND USER EQUIPMENT CONTEXT MIGRATION MANAGEMENT METHODS THEREOF

(71) Applicant: Industrial Technology Research Institute, Hsinchu (TW)

(72) Inventors: Kuo-Wei Wen, Taoyuan (TW);
Chun-Chieh Wang, Kaohsiung (TW);
Jian-Hao Chen, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/843,142

(22) Filed: Dec. 15, 2017

(65) Prior Publication Data
US 2019/0191344 A1    Jun. 20, 2019

(51) Int. Cl.
*H04W 36/00* (2009.01)
*H04L 29/08* (2006.01)
*G06F 9/455* (2018.01)

(52) U.S. Cl.
CPC ... *H04W 36/0033* (2013.01); *H04W 36/0061* (2013.01); *G06F 9/455* (2013.01); *H04L 67/10* (2013.01)

(58) Field of Classification Search
CPC .............. H04W 36/0033; H04W 36/0061
See application file for complete search history.

(56) References Cited

U.S. PATENT DOCUMENTS

| | | | |
|---|---|---|---|
| 8,982,738 B2 | 3/2015 | Li et al. | |
| 9,430,213 B2 | 8/2016 | Fu et al. | |
| 9,507,630 B2 | 11/2016 | Addepalli et al. | |
| 9,635,594 B2 | 4/2017 | Synnergren et al. | |
| 2005/0094670 A1 | 5/2005 | Kim | |
| 2009/0270111 A1* | 10/2009 | Nakamura | H04W 60/00 455/456.1 |
| 2016/0026506 A1* | 1/2016 | Jiang | G06F 9/5088 718/104 |

(Continued)

FOREIGN PATENT DOCUMENTS

TW    I581588 B    5/2017

OTHER PUBLICATIONS

Taiwan Patent Office, Office Action, Patent Application Serial No. 106144165, dated Jul. 6, 2018, Taiwan.

(Continued)

*Primary Examiner* — Angel T Brockman (57) ABSTRACT

A user equipment (UE) context migration management method applied to a mobile edge platform for managing a UE context of a mobile communication device is provided. An embodiment of the UE context migration management method includes: receiving at least one migration request for the UE context; calculating a first difference data corresponding to the UE context in response to the at least one migration request, wherein the first difference data represents a difference between the UE contexts obtained in two consecutive UE context retrieving operations corresponding to the at least one migration request; and transmitting the first difference data to the neighboring mobile edge platform to request the neighboring mobile edge platform to perform a migration operation of the UE context based on the first difference data.

16 Claims, 8 Drawing Sheets

(56) References Cited

U.S. PATENT DOCUMENTS

| | | | |
|---|---|---|---|
| 2016/0029205 A1* | 1/2016 | Sirotkin | H04W 24/02 455/418 |
| 2017/0064037 A1 | 3/2017 | Das et al. | |
| 2017/0201571 A1 | 7/2017 | Sherf et al. | |

OTHER PUBLICATIONS

"Technical Specification Group Services and System Aspects; System Architecture for the 5G System," 3rd Generaltion Patnership Project, Dec. 2017, 25 pages, Release 15, Ver. 1.6.0, 3GPP, France.

"Mobile Edge Computing (MEC); Framework and Reference Architecture," ETSI GS MEC003, Mar. 2016, pp. 1-18, V1.1.1., Mobile Edge Computing ETSI Industry Specificaiton Group, France.

Roemer et al., "Improving Virtual Machine Migration via Deduplication," 2014 IEEE 11th Internaitonal Conference on Mobile Ad Hoc and Sensor Systems, Oct. 2014, pp. 702-707, IEEE, US.

Ashino et al., "Virtual Machine Migration Method between Different Hypervisor Implementations and Its Evaluation," 2012 26th International Conference on Advanced Information Networking and Applications Workshops, Mar. 2012, pp. 1089-1094, IEEE, US.

Nguyen et al., "EBC: Application-level migration on multi-site cloud," 2012 International Conference on Systems and Informatics (ICSAI 2012), May 2012, pp. 876-880, IEEE, US.

I. Farris et al., "Providing ultra-short latency to user-centric 5G applications at the mobile network edge," Transactions on Emerging Telecommunications Technologies, Mar. 2017, 15 pages, John Wiley & Sons. Ltd., US.

Tsaklozos et al., "Live VM Migration under Time-Constrains in Share-Nothing IaaS-Clouds," IEEE Transactions on Parallel & Distributed Systems, Aug. 2017, Issue 28, vol. 28, pp. 1-14, IEEE, US.

Mohan et al., "An optimized approach for live VM migration using log records," $4^{th}$ ICCCNT—2013, Jul. 2013, 4 pages, IEEE, US.

Daradkeh et al., "Distributed Shared Memory Based Live VM Migration," 2016 IEEE $9^{th}$ International Conference on Cloud Computing, Jun. 2016, pp. 826-830, IEEE, US.

Download Pre-configured Cloud Images for Linux & Windows—Unix Arena, https://www.unixarena.com/2015/08/download-pre-configured-cloud-images-for-linux-windows.html, printed from the internet on Mar. 8, 2018, 2 pages.

Brian Christner, "Docker Base OS Image Size Comparison," Jul. 2015, 6 pages, BrianChristner.io, US.

Sharma et al., "Securing wireless communications of connected vehicles with Artificial Intelligence," 2017 IEEE International Symposium on Technologies for Homeland Security (HST) Apr. 2017, 7 pages, IEEE, US.

\* cited by examiner

MOBILE EDGE PLATFORM SERVERS AND USER EQUIPMENT CONTEXT MIGRATION MANAGEMENT METHODS THEREOF

TECHNICAL FIELD

The technical field relates to mobile edge platform servers and associated UE context migration management methods thereof.

BACKGROUND

In a typical mobile communication environment, a user equipment (UE) may communicate voice and/or data signals with one or more service networks via cellular stations of the service networks. The wireless communications between the UE and the service networks may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, Long Term Evolution Advanced (LTE-A) technology, and others.

In recent years, due to a substantial growth in cloud computing and network demand, a new generation of mobile communication system (5G) has been proposed. The new-generation mobile communication system has low latency, high loading and higher consistency feature requirements. In order to achieve the low-latency feature mentioned above, a new network framework known as Mobile Edge Computing (MEC) has come to be. MEC generally involves placing a server at the proximal end of the backhaul network of the base station and constructing a lightweight cloud that accommodates cloud computing and storage capabilities in order to intercept data sent back to the backend core network to the server for computing processing, thereby moving application services traditionally setup in the data center to the Mobile Edge Platform (MEP), allowing users to use application services deployed on the MEP and featuring the following advantages: (1) Nearby users can effectively decrease the service latency time; (2) Data on MEC can effectively reduce the load of data transmitted through the core network; (3) Provide service quality parameters at the wireless network end in order to ensure service quality, thereby enhancing user experience.

The existing MEC structure should support smart relocation. That is, when the user is accessing a service on MEP, if the user needs to move between MEPs to access new MEPs, the service in use must simultaneously carry out migration as the user moves. In the data center environment, the service data is located in the virtual machine/container on MEP. Conventionally, when a service is to be migrated, all the data in the virtual machine/container should be moved, resulting in time-consuming and huge data volume migration in excess. At the same time, in the MEC environment, if the user continues to move, switch to and access different MEPs, the virtual machine/container will need to constantly migrate, leading to diminished system performance. In addition, during service migration, since only newly added data in the original virtual machine/container is targeted for migration, the newly added data may not belong to the moving user, thus wasting network resources and transmission time.

SUMMARY

Mobile edge platform servers applied to a mobile edge computing network and user equipment context migration management methods applied to a mobile edge platform thereof are provided.

In an exemplary embodiment, a user equipment (UE) context migration management method applied to a mobile edge platform for managing a UE context of a mobile communication device is provided. The method comprises the steps of: receiving at least one migration request of the UE context; calculating a first difference data corresponding to the UE context in response to the at least one migration request, wherein the first difference data represents a difference between the UE contexts obtained in two consecutive UE context retrieving operations corresponding to the at least one migration request; and transmitting the first difference data to at least one neighboring mobile edge platform to request the neighboring mobile edge platform to perform a migration operation of the UE context based on the first difference data, wherein the mobile edge platform connects to the neighboring mobile edge platform and wirelessly connects to the mobile communication device.

Another exemplary embodiment of a mobile edge platform server applied to a mobile edge computing network includes a mobile edge platform. The mobile edge platform comprises a communication device and a controller. The communication device is configured to perform signal transmission and reception with at least one neighboring mobile edge platform and wireless transmission and reception with a mobile communication device. The controller is configured to receive at least one migration request related to a UE context of the mobile communication device via the communication device, calculate a first difference data corresponding to the UE context in response to the at least one migration request, and transmit the first difference data to the neighboring mobile edge platform via the communication device to request the neighboring mobile edge platform to perform a migration operation of the UE context based on the first difference data, wherein the first difference data represents a difference between the UE contexts obtained in two consecutive UE context retrieving operations corresponding to the at least one migration request.

Methods disclosed above may be practiced by the devices or systems disclosed above which are hardware or firmware capable of performing particular functions and may take the form of program code embodied in a memory and/or embodied in a computer-readable storage medium/computer program product, combined with specific hardware. When the program code is loaded into and executed by an electronic device, a controller, a computer processor or a machine, the electronic device, the processor, the computer or the machine becomes an apparatus or system for practicing the disclosed method.

BRIEF DESCRIPTION OF THE DRAWINGS

The application will become more fully understood by referring to the following detailed description with reference to the accompanying drawings, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that the embodiments may be realized in software, hardware, firmware, or any combination thereof.

Embodiments of the application provide systems and methods for migrating user equipment contexts (UE contexts) assisted by mobile edge platforms (MEPs) based on a mobile edge computing (MEC) environment in which when a specific user is moving and engages in MEP access switching, it is only necessary to move partial of UE contexts of the specific user from one MEP to another to ensure the required services can be quickly migrated, thereby reducing migration time and enhancing overall system performance.

Figure 1:
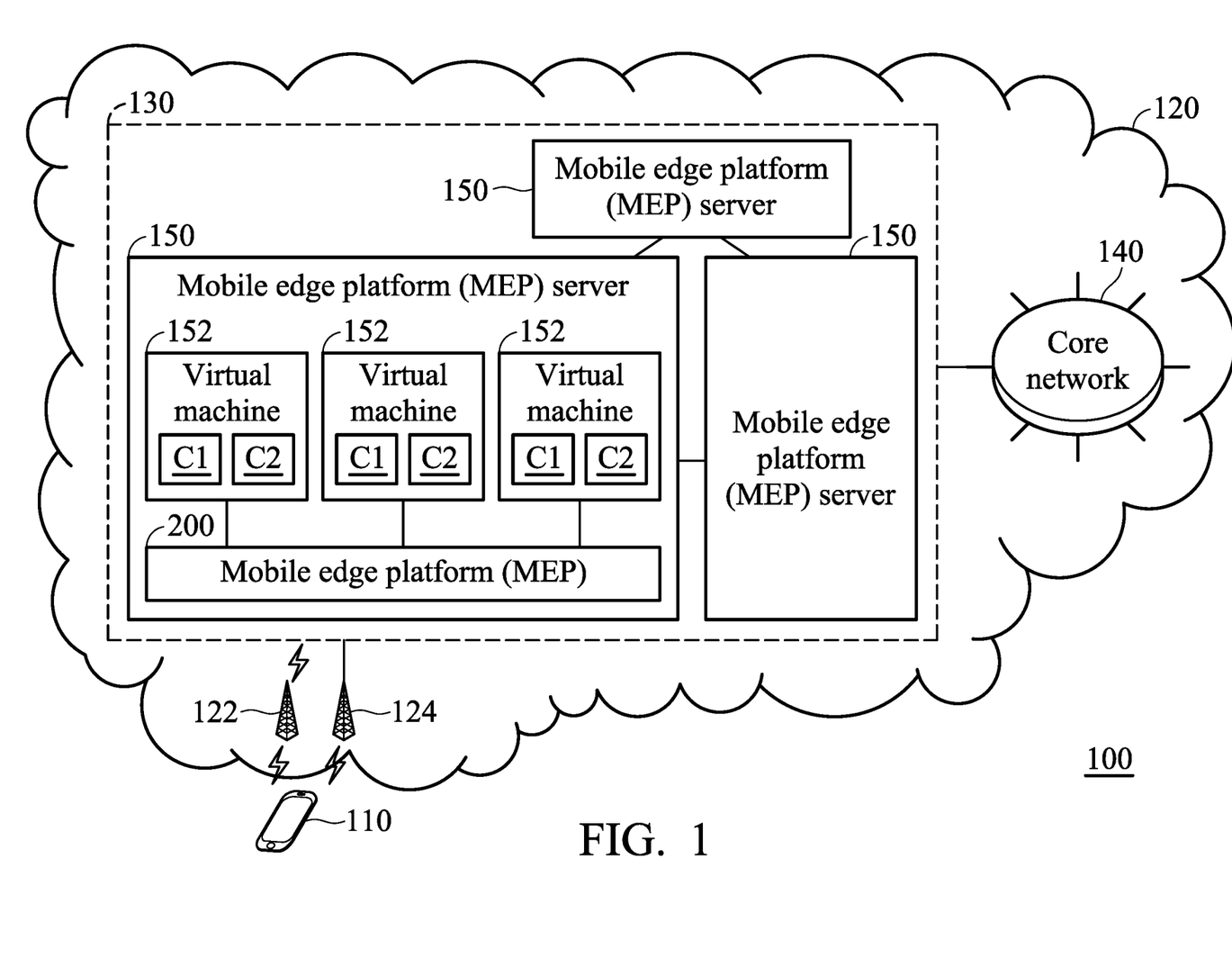
FIG. 1 is a block diagram illustrating a mobile communication environment according to an embodiment of the application.

FIG. 1 is a block diagram illustrating a mobile communication environment according to an embodiment of the application. In the mobile communication environment 100, a mobile communication device 110 is wirelessly connected to a base station 122 or a base station 124 of a service network 120 through the space interface to obtain the wireless access service. Generally speaking, the base stations 122 and 124 may be base stations or access stations or may be home base stations of a wideband CDMA system or evolved home base stations of a long term evolution system and the base stations 122 and 124 may be handled by a control node to provide the necessary wired/wireless transmission of the service network 120. The mobile communication device 110 is also referred to as a user equipment (referred to as UE) or a mobile station, and may support various radio access technologies. The mobile communication device 110 may be a device such as a mobile phone, a computer system, or the like. The mobile communication device 110 may at least include a communication device and a controller for performing wireless transmission with the base station 122 and the base station 124. The mobile communication device 110 may perform wired communication and/or wireless communication of voice and/or data services with the service network 120 through the base stations 122 and 124.

The wireless communications between the mobile communication device 110 and the service networks 120 may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, Long Term Evolution Advanced (LTE-A) technology, and others. The service network 120 includes a mobility edge computing network 130 and a core network 140. A plurality of mobile edge platform servers 150 (also referred to as mobile edge hosts) are connected to each other by a wireless or wired connection to form a mobile edge computing network 130, but the application is not limited thereto. The core network 140 is responsible for performing mobility management, network-side authentication, and interfaces with public/external networks (e.g., the Internet). For example, the core network 140 may be an Evolved Packet Core (EPC) which includes a Home Subscriber Server (HSS), Mobility Management Entity (MME), Serving Gateway (S-GW), and Packet Data Network Gateway (PDN-GW or P-GW), but the application is not limited thereto.

The mobile edge computing (MEC) network 130 is connected between the core network 140 and the mobile communications device 110 to provide a mobile edge computing environment for providing lightweight clouds at near side of the backhaul network of the base stations 122, 124 to provide cloud computing and storage capabilities for intercepting data back to the back-end core network 140 to the mobile edge platform server 150 for processing. Each mobile edge platform server 150 further includes a mobile edge platform (MEP) 200 and a plurality of virtual machines and/or containers 152. The mobile communication device 110 may be wired/wirelessly connected to the different MEPs 200 of the MEC network 130 through the base stations 122 and 124, respectively. The base stations 122 and 124 may communicate with each other via a wired connection such as the Internet, a wired LAN, etc., and/or a wireless connection such as a wireless network, a WCDMA network, a 3G network, a wireless local area network (WLAN), a Bluetooth network and the like to connect to the MEC network 130 to access each of the MEPs 200 in the MEC network 130 and perform communication and data transmission with each other. For example, the base station 122 may be connected to the MEC network 130 through a wireless connection, while the base station 124 may be connected to the MEC network 130 by an Ethernet cable and may further be connected to the Internet and then connected to the core network 140 via the Internet, but the application is not limited thereto.

In this embodiment, the mobile communication device 110 may access one of the MEPs 200 in the MEC network 130 through the base station 122, and access another MEP 200 in the MEC network 130 through the base station 124. The MEP 200 runs a variety of services with low latency requirements, data analytics assistance and regional connectivity, including V2X, Virtual Reality, Augmented Reality, Instant Online games, eHealth and video analytics and so on, but the application is not limited thereto. These services running on the MEP 200 all operate in the corresponding virtual machines or containers 152 of the MEP server 150. To simplify the description, in the following embodiments, the virtual machines and/or containers 152 are collectively referred to as a virtual machine 152. Each virtual machine 152 includes at least one UE context corresponding to one or more specific services of users of one or more mobile communication devices 110. For example, the first UE context C1 and the second UE context C2 may be included in the virtual machine 152, and the first UE context C1 and the second UE context C2 may correspond to different uses of the same service, the same user corresponding to different services, or different users corresponding to different services. The UE context is contextual data for each user using the service. For example, in one embodiment, the UE context may be a file in a format such as JSON, XML or YAML, but the application is not limited thereto.

Figure 2:
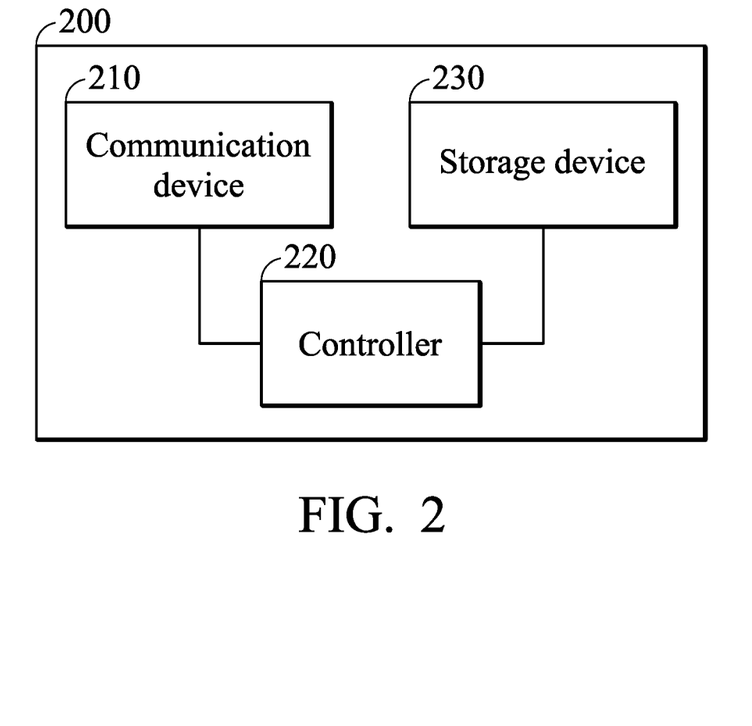
FIG. 2 is a schematic diagram of a hardware structure of a mobile edge platform according to an embodiment of the application.

FIG. 2 is a schematic diagram of a hardware structure of a mobile edge platform according to an embodiment of the application. As shown in FIG. 2, the mobile edge platform 200 includes at least a communication device 210, a controller 220, and a storage device 230.

The communication device 210 is configured to receive information about the mobile communication device 110 and other MEP 200. Specifically, the communication device 210 may receive a signal from the current connected network and transmit the signal to the current connected network. The communication device 210 may include a wired communication module that may be coupled (electrically connected) to one or more wired networks and may allow utilization of a wired network to communicate with one or more additional devices, computer servers, and/or network nodes, such as base stations or the like. The communication device 210 may further include a wireless module, may be coupled (electrically connected) to one or more antennas (not shown), and may allow a wireless network to communicate with one or more additional devices, a computer server and/or network nodes (such as base stations, etc.). The mobile edge platform 200 may support various communication protocols such as CDMA, GSM, EDGE, HSDPA, Wi-Fi (eg IEEE 802.11a/b/g/n), Bluetooth and Wi-MAX, and protocols such as email, instant messaging (IM), and smart messaging services and other RATs standards, but the application is not limited thereto. Specifically, the communication device 210 is coupled (electrically connected) to the controller 220 and bidirectionally links with communication devices having the same communication channel and protocol so as to receive external messages such as messages sent by each mobile communication device 110 and the MEP 200 and then output received messages to the controller 220, and broadcasts the message output by the controller 220 to the outside through the communication device 210.

The controller 220 may be a general-purpose processor, a Micro Control Unit (MCU), a Digital Signal Processor (DSP), or the like, which includes various circuits for providing the functions of data processing and computing, but the application is not limited thereto. The controller 220 which is coupled (electrically connected) to the communication device 210 and the storage device 230, may be used to load and execute a series of instructions and/or program codes from the storage device 230 to control the operations of the communication device 210 and the storage device 230 to perform the UE context migration management methods of the application, the details of which will be described more in the following paragraphs.

The storage device 230 may be a non-volatile storage medium (e.g., Read-Only Memory (ROM), Flash memory, magnetic tape, hard disk, or optical disc), or a volatile storage medium (e.g., Random Access Memory (RAM)), or any combination thereof for storing data, such as intermediate data generated during the calculation process and the execution result information and so on. The storage device 230 may also store instruction sets and/or program code modules that can be executed by the controller 220, but the application is not limited thereto. Generally speaking, program code modules contain routines, programs, objects, components, and so on. The storage device 230 may further store various items of data required for the operation, such as UE contexts, difference data, and so on, but the application is not limited thereto.

As will be appreciated by persons skilled in the art, the circuits in the controller 220 will typically comprise transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems and those skilled in the art will understand that the present application is not limited thereto.

Although they are not shown, the mobile communication device 110 in FIG. 1 may also comprise a communication device and a controller. The communication device is configured to provide wireless transmission and reception functions to communication between each of the base stations 122 and 124 and each of the MEPs 200 in the mobile communication environment 100, and the controller is used to control the operation of the communication devices. The operations of the communication device and the controller of the mobile communication device 110 are similar to that of the embodiment shown in FIG. 2, and thus details are omitted here for brevity.

Figure 3:
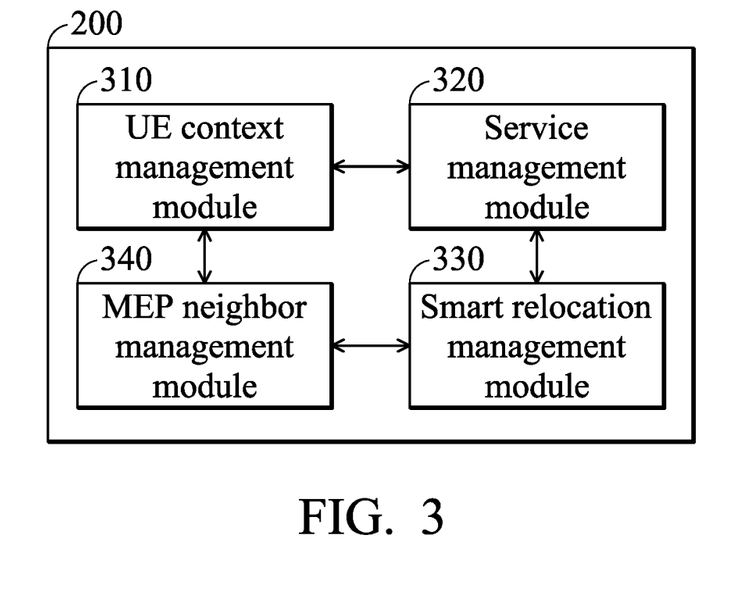
FIG. 3 is a schematic diagram of a functional module architecture of the mobile edge platform according to an embodiment of the application.

FIG. 3 is a schematic diagram of functional module architecture of the MEP 200 according to an embodiment of the application. The functional module architecture of the MEP 200 includes a UE context management module 310, a service management module 320, a smart relocation management module 330, and an MEP neighbor management module 340. The UE context management module 310, the service management module 320, the smart relocation management module 330, and the MEP neighbor management module 340 can be stored in the storage device 230 (e.g., memory) of the MEP 200, and can be loaded and executed at an appropriate timing by the controller 220 of the MEP 200 to perform the UE context migration management method of the present application. More particularly, the controller 220 may perform the UE context migration management method applied to the MEP 200 of the present application by controlling the operations of the UE context management module 310, the service management module 320, the smart relocation management module 330 and the MEP neighbor management module 340.

The UE context management module 310 mainly carries out the importation, retrieval, deletion and termination of UE contexts of one or more users on the virtual machine 152 through exclusive application programming interface (API). Specifically, the UE context management module 310 sends a UE context retrieving request to the virtual machine 152 during every migration through dedicated API in order to commence UE context retrieving operations. Additionally, targeting UE context obtained from two consecutive UE context retrieving operations, a cross-comparison is carried out to calculate difference data (Diff) or integrate difference data Diff received from neighboring MEPs 200 into corresponding UE context. In particular, the difference data Diff refers to the difference obtained by the UE context management module 310 from two consecutive UE context retrieving operations corresponding to the migration requests. That is, the difference data Diff records changes between current UE context obtained from the UE context management module 310 targeting the same service and the same user's UE context retrieving request sent through dedicated API and the UE context previously obtained from the UE context management module 310 sending a UE context retrieving request to the virtual machine 152 through the dedicated API. In some embodiments, the UE context management module 310 can also generate a profile of a specific UE context to record related information such as the source of the UE context and related information.

The service management module 320 carries out status inquiry and activation operations on various services on the virtual machine 152 through the dedicated API; the smart relocation management module 330 is responsible for communicating with other MEP 200 related to UE context migration and receiving migration events triggered at the mobile communication device 110. For example, the above migration events may include time indicators for the mobile communication device 110 at which a migration starts and at which the migration has completed. The MEP neighbor management module 340 can communicate with neighboring MEP 200 (periodically communication within a predetermined time period or communication at the time of a specific event triggered) to collect information of the neighboring MEP 200 and manage and record information of the neighboring MEP 200, so as to know which UE contexts of the neighboring MEP are to be migrated when a UE context migration procedure is needed when the process of migrating the UE context needs to be performed. The MEP 200 may have multiple respective virtual machines 152, while the various services running on the MEP 200 are operated on the corresponding virtual machines 152 of the MEP 200. The respective virtual machine 152 frameworks should at least contain one or multiple UE contexts. The above-mentioned UE context not only accommodates the access of corresponding services in the virtual machine 152, but also accommodates direct UE context access by the MEP 200 through the API, thereby responding to the user's demand for the MEP switching and service migration when the user is moving.

More particularly, the controller 220 may access the corresponding UE contexts of the service that needs to be migrated through the UE context management module 310, perform a status inquiry and activation on a designated service within the virtual machine 152 through the service management module 320, carry out relevant UE context migration communication with other MEP 200 and receive the moving events triggered by the mobile communication devices 110 through the smart relocation management module 330, and obtain the information of neighboring MEPs related to the service migration through the MEP neighbor management module 340, so as to perform a migration operation of the UE context in response to the MEP switching and the service migration requirement caused by the user movement to move UE contexts of all the services with migration needs to corresponding MEP. The details of which will be described later.

Although they are not shown, the MEP 200 may further comprise other functional units, such as an Input/Output (I/O) device (e.g., physical button, keyboard, etc.), a display device, an audio device or the like, and the application is not limited thereto.

It should be understood that each of the elements or modules in the present embodiments may be a device having a corresponding function, which can have the appropriate hardware circuits or elements to perform the corresponding function, however, the device is not limited to be entity device, which can also be a virtual device having program and software with respective functions or a device having capabilities for processing and running the program and software. The manner of operations of the respective elements can further refer to the following description of the methods. In one embodiment, the UE context management module 310, the service management module 320, the smart relocation management module 330, and the MEP neighbor management module 340 may be implemented as a chip, a circuit board, or a circuit, and the controller 120 may control the operations of the UE context management module 310, the service management module 320, the smart relocation management module 330 and the MEP neighbor management module 340 to perform the UE context migration management method of the present application, which will be discussed further in the following paragraphs.

Figure 4:
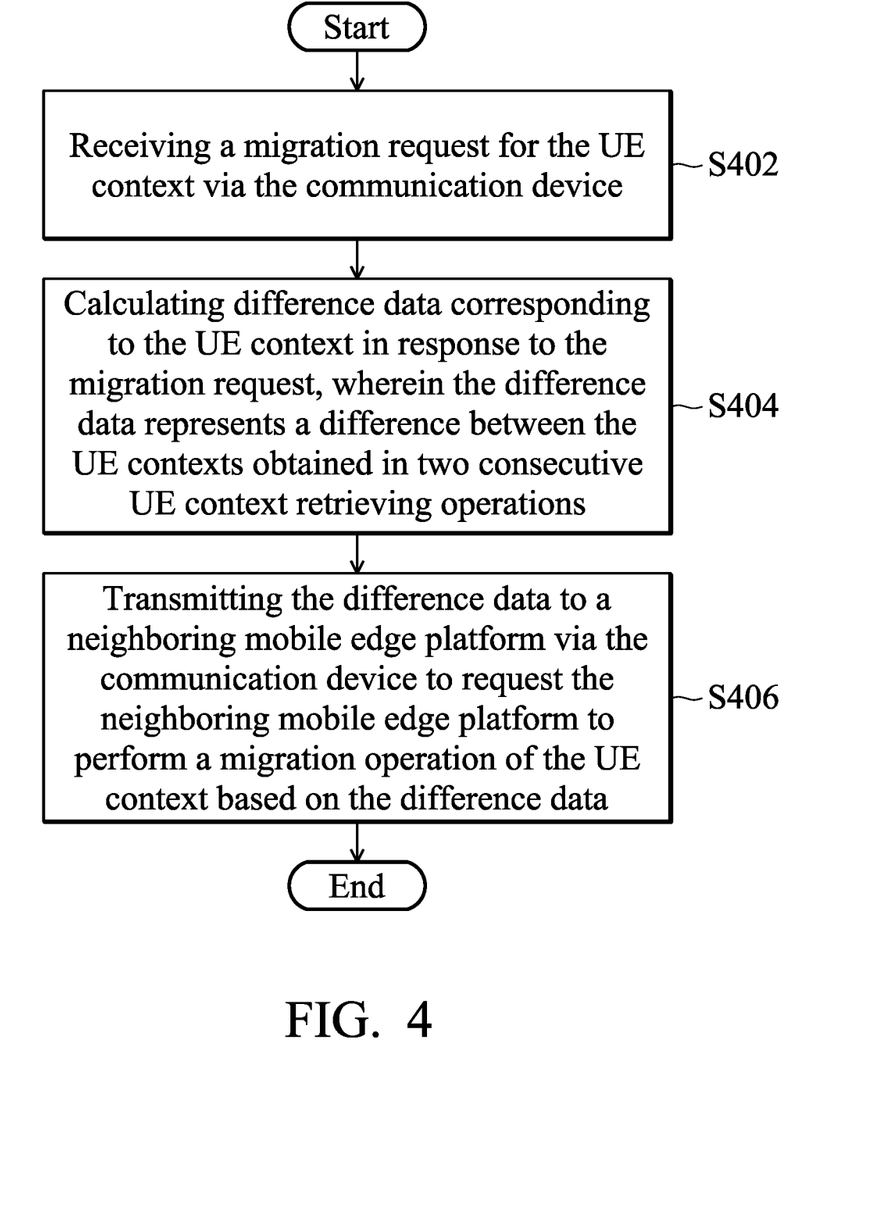
FIG. 4 is a flowchart of an UE context migration management method according to an embodiment of the application.

FIG. 4 is a flowchart of an UE context migration management method according to an embodiment of the application. Please refer together with FIG. 1, FIG. 2, FIG. 3 and FIG. 4. The UE context migration management method of the application may be applied to any MEP in a mobile edge computing network, such as the MEP 200 as shown in FIG. 2 and performed by the controller 220 of the MEP 200. In the embodiment of FIG. 4, it is assumed that the mobile communication device 110 can be connected to the MEP 200 through the base station 122 to use a service SRA on a MEP MEP_A, and the mobile communication device 110 is crossing to a neighboring MEP MEP_B during using the service SRA, resulting in a MEP switching and service migration needs.

When the mobile communication device 110 uses the service SRA and needs to perform UE context switch from the source MEP 200 (e.g., MEP_A) to the neighboring MEP MEP_B when moving from the source MEP 200 to the neighboring MEP, in S402, the controller 220 of the MEP 200 receives at least one migration request of the UE context via the communication device 210.

In step S404, the controller 220 of the MEP 200 calculates a difference data corresponding to the UE context in response to the at least one migration request, wherein the difference data represents a difference between the UE contexts obtained in two consecutive UE context retrieving operations corresponding to the at least one migration request. To be more specific, the UE context management module 310 may send consecutive UE context retrieving requests to the virtual machine 152 through the dedicated API to obtain corresponding UE contexts. The controller 220 can access UE contexts of the service each time the UE context management module 310 sends a UE context retrieving request, compare the current UE context obtained from the current UE context retrieving operation and the UE context obtained from the previous UE context retrieving operation to calculate the difference between the two, and generate the difference data based on the difference. In other words, the difference data can record the location and size of the difference in UE contexts obtained by two consecutive UE context retrievals, which represent the difference between the two consecutive UE context retrieving operations in terms of UE context.

After generating the difference data, as shown in S406, the controller 220 of the MEP 200 transmits the above difference data to a neighboring MEP to request the neighboring MEP to perform a migration operation of the UE context based on the difference data. In this embodiment, since the mobile communication device 110 moves from the source MEP 200 to the neighboring MEP MEP_B, MEP_B is the neighboring MEP corresponding to the migration request.

After the MEP MEP_B receives the above difference data from the neighboring MEP 200 through its communication device, the controller of the MEP MEP_B generates a second UE context by performing a merge calculation on the received difference data and the previous received first UE context and updates the second UE context to a virtual machine 152 of a corresponding service SRA on the MEP MEP_B, so that the original service SRA is migrated to the MEP MEP B to continue its execution.

In another embodiment, when the mobile communication device 110 using a service SRB moves from another source MEP MEP_C to the MEP 200, the MEP 200 serves as a target mobile edge platform (Target MEP), the MEP 200 may receive another difference data (second difference data) from the MEP_C through the communication device 210 and then perform merging calculation to generate new UE context data based on the received difference data and the previously received UE context, and then updates the new UE context to a virtual machine 152 corresponding to the service SRB on the MEP 200 to migrate the original service SRB to the MEP 200 to continue execution.

Figure 5:
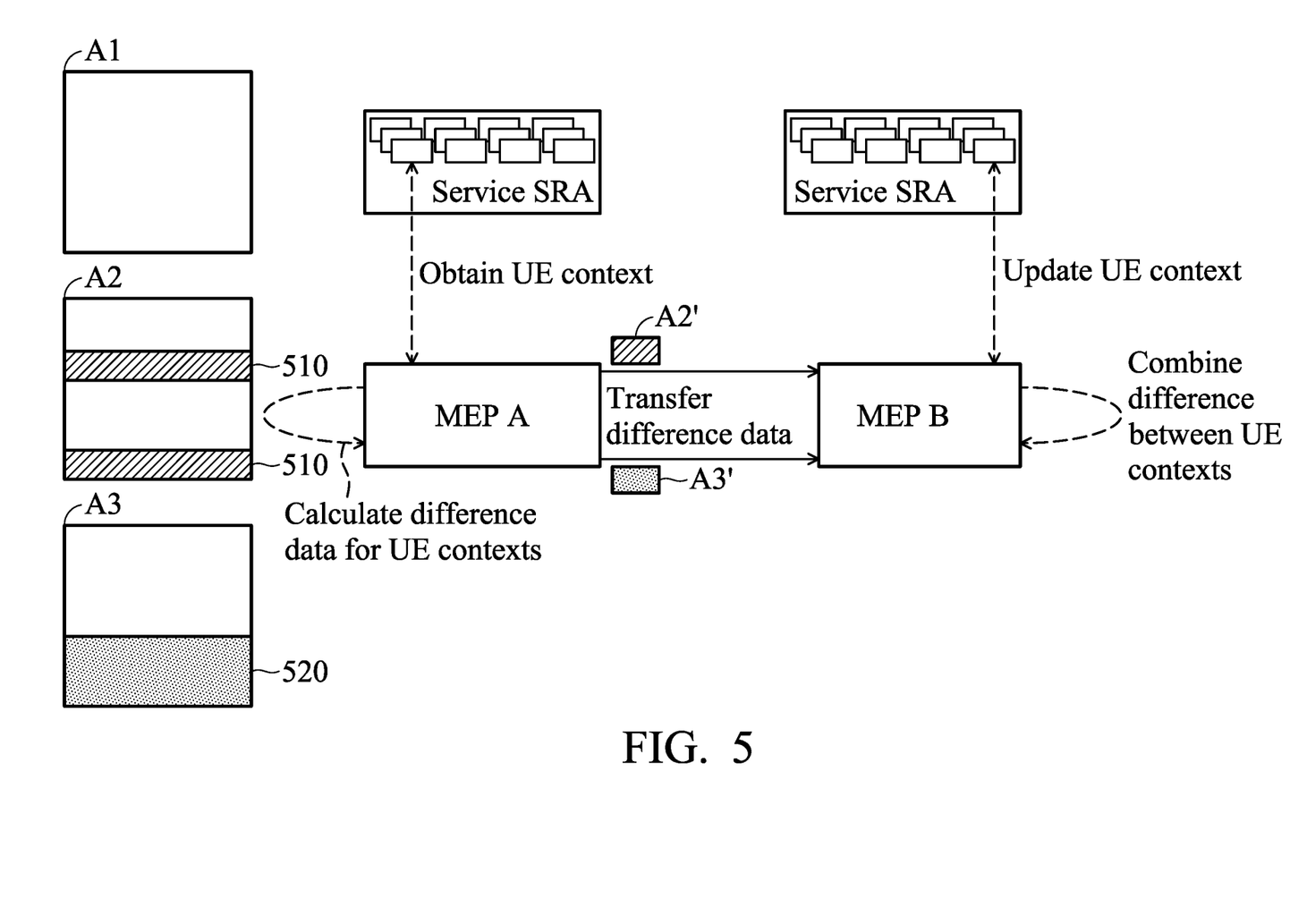
FIG. 5 is a schematic diagram illustrating an exemplary embodiment of only the difference portion of UE contexts for two consecutive UE context extraction requests are being transmitted between the mobile edge platforms.

FIG. 5 is a schematic diagram illustrating an exemplary embodiment of only the difference portion of UE contexts for two consecutive UE context retrieving requests are being transmitted between the mobile edge platforms. As shown in FIG. 5, the mobile communication device UE moves from the source MEP MEP_A to the neighboring MEP MEP_B. At time t0, the first UE context retrieving request for retrieving the UE context from the MEP MEP_B has issued and there is no UE context for a corresponding service in the virtual machine 152 at the same time, thus the MEP MEP_A performs the first UE context retrieving operation to obtain the current UE context A1 for the corresponding service in the virtual machine 152 and transmits the entire UE context A1 to the MEP MEP_B. The MEP MEP_B then obtains the UE context A1 and updates the UE context A1 to the UE context of the corresponding service.

It is assumed that the UE context is changed and the second UE context retrieving request occurs at time t1, and thus the MEP MEP_A performs a second UE context retrieving operation to access a UE context A2 in the service, and calculates the difference between the UE context A2 and the UE context A1 obtained in the previous UE context retrieving operation (i.e., the first UE context retrieving operation) to obtain a difference which is the partial data 510 of the UE context A2. A difference data A2' is generated based on the partial data 510, and only the difference data A2' is transmitted to the MEP MEPB.

After receiving the difference data A2', the MEP MEP B obtains the previously received UE context A1 from the service and merges the UE context A1 with the difference data A2' to generate a new UE context B1 (i.e., the UE context A2), and then updates the new UE context B1 to the corresponding service. Specifically, the new UE context B1 is the restored UE context A2, and the MEP MEP B updates the UE context B1 to be the UE context of the corresponding service.

Similarly, it is assumed that a second UE context retrieving request for retrieving the UE context from the MEP MEP_B has issued at time t3, and thus the MEP MEP_A performs a third UE context retrieving operation to access a UE context A3 in the service, and calculates the difference between the UE context A3 and the UE context A2 obtained in the previous UE context retrieving operation (i.e., the second UE context retrieving operation) to obtain a difference which is the partial data 520 of the UE context A3. A difference data A3' is generated based on the partial data 520, and only the difference data A3' is transmitted to the MEP MEPB.

After receiving the difference data A3', the MEP MEP B obtains the previously received UE context B1 from the service and merges the UE context B1 with the difference data A3' to generate a new UE context B2 (i.e., the UE context A3), and then updates the new UE context B2 to the corresponding service. Specifically, the new UE context B2 is the restored UE context A3.

In one embodiment, when the MEP 200 (e.g., the MEP_B as shown in FIG. 5) receives the difference data from the neighboring MEP (e.g., the MEP_A as shown in FIG. 5) through the communication device 210 and the newly merged UE context is updated into the virtual machine 152 of the corresponding service, the controller 220 of the mobile edge platform 200 may automatically delete the difference data to save storage space. In another embodiment, after the MEP 200 (e.g., the MEP_A as shown in FIG. 5) transmits the difference data to the neighboring MEP (e.g., the MEP_B as shown in FIG. 5) on the migration path through the communication device 210, the controller 220 receives a deleting request from the neighboring MEP via the communication device 210, and deletes the difference data in response to the deleting request. The neighboring MEP may send the deleting request to the MEP 200 after completing the updating of the new UE context to the corresponding service.

Thus, only the difference part in the UE contexts obtained from two consecutive UE context retrieving requests with nearby MEP needs to be transmitted, and only partial UE context is moved. For the difference part, the smaller the difference the smaller the transmitted data volume, thus less moving time needed. This enables required services to be migrated quickly, thereby reducing migration time and enhancing overall system performance. When different MEPs require frequent and large quantities of UE context transmission, only partial UE context needs to be moved, which can effectively resolve the current technical issue encountered: If the user continues to move and switch to and access different MEP, the large amount of migration will diminish system performance. Also, at the time of service migration, only data newly added to the original virtual machine is targeted. Hence, the problem of "newly added data is not the data of the moving user may be encountered, resulting in a waste of network resources and transmission time" can be resolved.

For explanation, specific UE context migration management methods are illustrated as actual implementation examples in the following embodiments, and those skilled in the art will understand that the present application is not limited thereto.

Figure 6A:
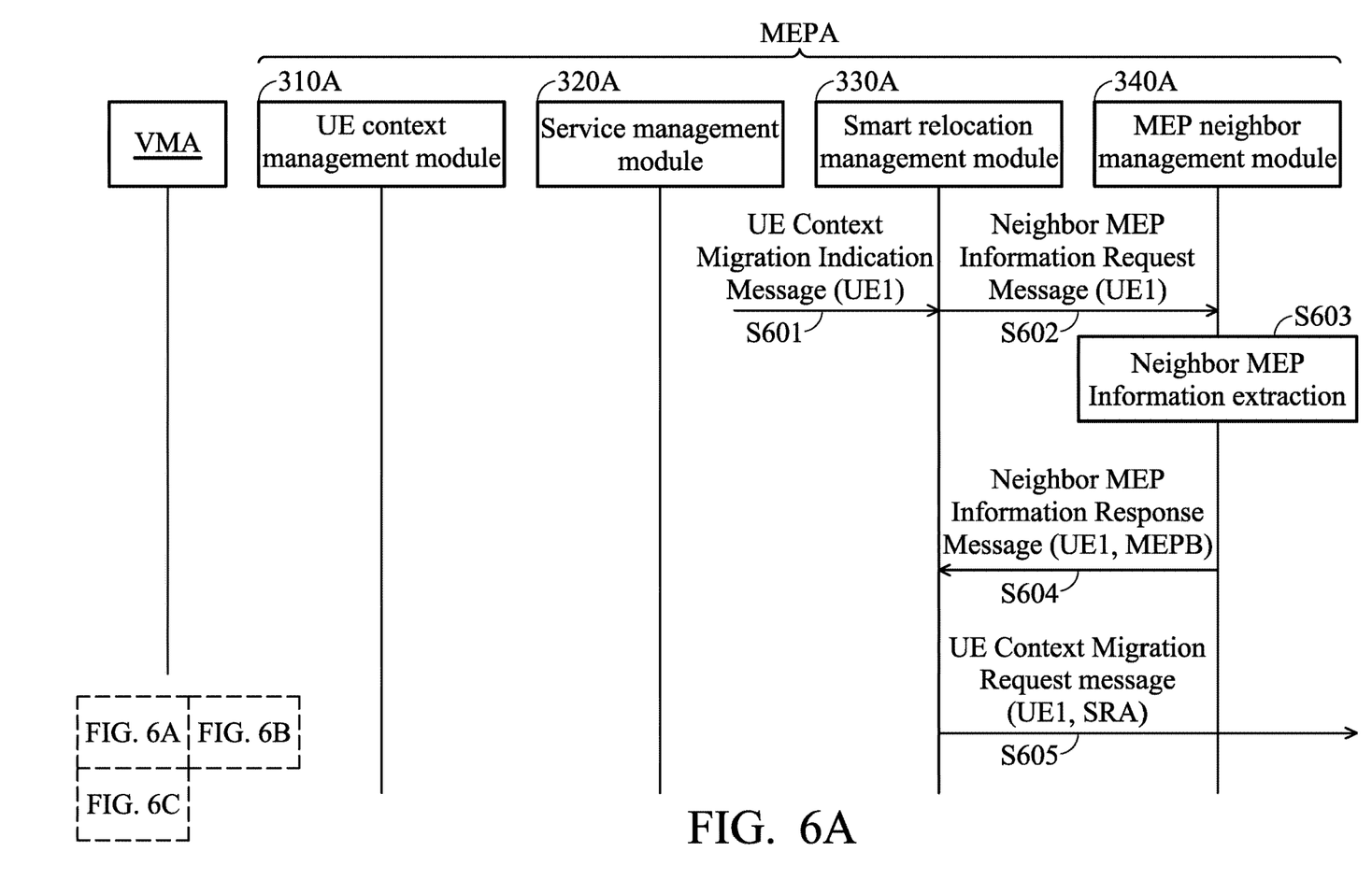
FIGS. 6A~6C show a message sequence chart illustrating the difference data migration of UE contexts when the mobile communication device starts a migration according to another embodiment of the application.
Figure 6B:
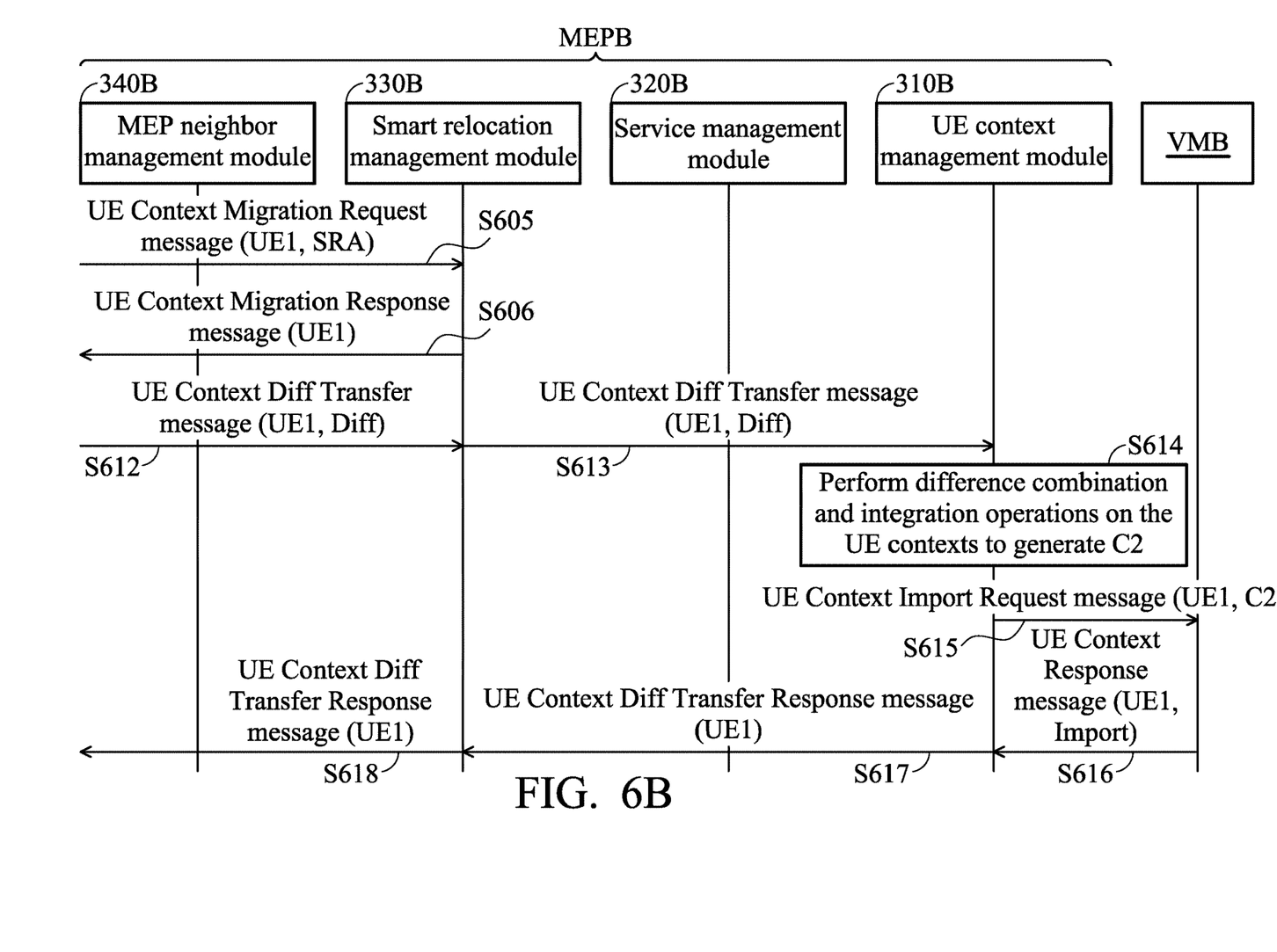
Figure 6C:
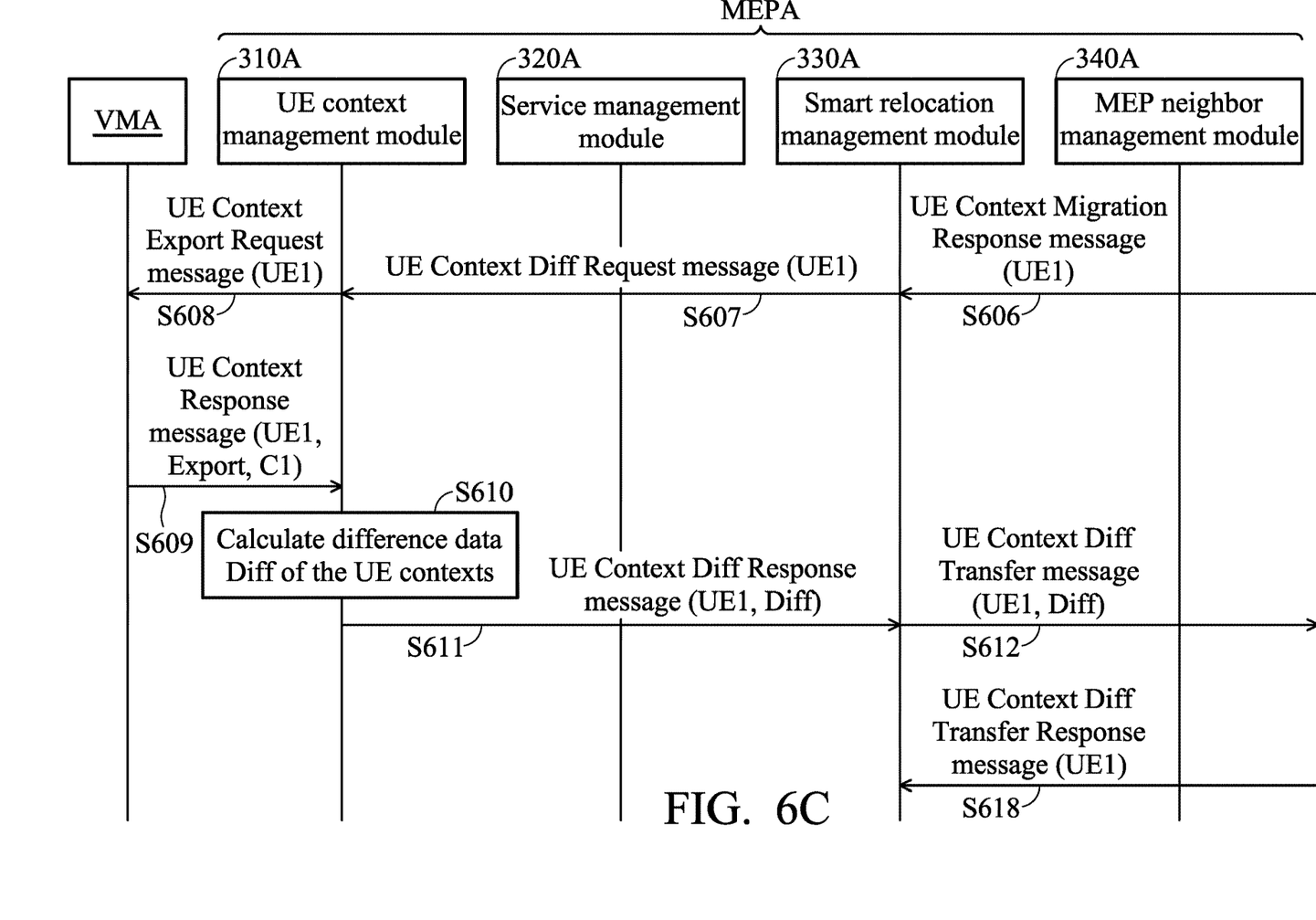

FIGS. 6A~6C show a message sequence chart illustrating the difference data migration of UE contexts when the mobile communication device UE1 (e.g., the mobile communication device 110 of FIG. 1) starts a migration according to another embodiment of the application. In this embodiment, consider that the mobile communication device UE1 performs a first service SRA (for example, V2X or AR application service) from the source MEP MEP_A and moves to the target MEP MEP_B. Therefore, the source MEP MEP_A receives a migration request regarding the above UE context. In this embodiment, the MEPs MEP_A and MEP_B respectively include the architecture as same as those shown in FIG. 2 and FIG. 3. The MEP MEP_A includes a UE context management module 310A, a service management module 320A, a smart relocation management module 330A, and a MEP neighbor management module 340A. The mobile edge platform MEP B includes a UE context management module 310B, a service management module 320B, a smart relocation management module 330B, and a MEP neighbor management module 340B. The UE context corresponding to the first service SRA of the mobile communication device UE1 is stored in the virtual machine VMA in the MEP MEP_A while it is stored in the virtual machine VMB in the MEP MEP_B.

As shown in FIG. 6A, the smart relocation management module 330A on the source MEP MEP_A receives a UE context migration indication message (UE Context Migration Indication Message) including at least one UE identifier (UE ID) (S601). In this embodiment, the UE identifier is UE1. For example, the UE context migration indication message may be generated according to a handover request or a service relocation request. The smart relocation management module 330A sends a Neighbor MEP Information Request including the above UE identifier to the MEP neighbor management module 340A as shown in FIG. 6A (S602). After receiving the Neighbor MEP Information Request message from the neighboring MEP, as shown in FIG. 6A, the MEP neighbor management module 340A performs a neighbor MEP Information extraction for extracting the neighboring MEP information (S603). Since the MEP neighbor management module 340A can collect the information of all the peripheral MEPs by communicating information with the corresponding MEP neighbor management module of each neighboring MEP, it is possible to obtain the information of MEP identifier (MEP IP) corresponding to the UE identifier (UE1). The MEP identifier indicates that which MEP is the next MEP to be migrated to. In this embodiment, since the target MEP is MEP_B, the MEP identifier is set to be MEP_B.

After obtaining the MEP identifier (MEP_B) corresponding to the UE identifier (UE1), as shown in FIG. 6A, the MEP neighbor management module 340A sends to the smart relocation management module 330A a neighbor MEP Information Response Message including at least the UE identifier (UE1) and the MEP identifier (MEP_B) (S604). In response to the neighbor MEP Information Response Message, the smart relocation management module 330A on the MEP MEP_A sends a UE Context Migration Request message including at least the UE identifier (UE1) and a MEP service identifier (MEP Service ID) to the smart relocation management module 330B corresponding to the MEP identifier (MEP_B) (S605). In this embodiment, the MEP identifier is MEP_B and the service identifier is SRA. That is, the source MEP MEP_A may determine the MEP_B to be the target MEP according to the MEP identifier, and the source MEP MEP_A may inform the target MEP MEP_B information regarding the corresponding UE context for which UE (i.e., UE1) of which service (i.e., SRA) needs to be migrated through the UE identifier and the service identifier.

In response to the UE Context Migration Request message, as shown in FIG. 6B, the smart relocation management module 330B transmits to the smart relocation management module 330A on the source MEP MEP_A a UE Context Migration Response message at least including a UE identifier (UE1) (S606) to inform the source MEP MEP_A that it already knows that the corresponding UE context for the UE UE1 of the service SRA needs to be migrated. The smart relocation management module 330A on the source MEP MEP_A sends to the UE context management module 310A a UE Context Diff Request message including at least the above-mentioned UE identifier (UE1) in response to the UE Context Migration Response message, as shown in FIG. 6C (S607).

Correspondingly, the UE context management module 310A sends a UE Context Export Request message including at least the UE identifier (UE1) to the virtual machine VMA where the UE context being requested is located through the API, as shown in FIG. 6C (S608). In this embodiment, the UE Context Export Request message can be referred as the aforementioned UE context retrieving request message for performing the UE context retrieving operation. In response to the UE Context Export Request message, as shown in FIG. 6C, the virtual machine VMA obtains a UE context C1 corresponding to the UE identifier according to the UE identifier (UE1), and sends a UE Context Response message including at least the UE identifier (UE1), a data type of "Export", and the obtained UE context C1 to the UE context management module 310A (S609).

The UE context management module 310A calculates a difference data Diff of the UE contexts based on the UE Context Response message (S610), compares the current UE context C1 in the UE Context Response message with the stored UE context (e.g., C0) obtained from the previous UE context retrieving operation, obtains a difference part between the two and generates the difference data Diff according to the difference part therebetween (that is, Diff=C1−C0), and after obtaining the difference data, it sends a UE Context Diff Response message at least including the UE identifier (UE1) and the difference data Diff to the smart relocation management module 330A, as shown in FIG. 6C (S611).

The smart relocation management module 330A then transmits a UE Context Diff Transfer message including at least the UE identifier (UE1) and the difference data Diff to the smart relocation management module 330B of the MEP MEP B (as shown in FIG. 6C) (S612), such that the smart relocation management module 330B respectively sends a UE Context Diff Transfer message at least including a UE identifier (UE1) and the difference data Diff to the UE context management module 310B (as shown in FIG. 6B) (S613).

After receiving the UE Context Diff Transfer message, the UE context management module 310B performs difference combination and integration operations on the UE contexts to extract the difference data Diff, and performs difference combination and calculation based on the currently received difference data Diff and the UE contexts (C0) received last time to combine the difference part indicated by the difference data Diff into a corresponding position of the previously received UE contexts to generate a new UE context data C2 (C2=C0+Diff=C1) (S614) and sends a UE context Import Request message including the UE1 and the new UE context data C2 to the virtual machine VMB to update the UE context C2 into the corresponding UE context of the virtual machine VMB (as shown in FIG. 6B) (S615). More particularly, since the MEP MEP_B already knows the location of the service to be migrated and the UE context according to the above-mentioned UE Context Migration Request message, the new UE context can be easily updated to the corresponding UE context.

After the virtual machine VMB updates the new UE context to the corresponding UE context therein, it replies the UE context management module 310B with a UE Context Response message at least including the UE identifier (UE1) and the data type of "Import" (as shown in FIG. 6B) (S616).

In response thereto, the UE context management module 310B transmits a UE Context Diff Transfer Response message at least including the UE identifier (UE1) to the smart relocation management module 330B (as shown in FIG. 6B) (S617).

The smart relocation management module 330B accordingly sends a UE Context Diff Transfer Response message at least including a UE identifier (UE1) to the smart relocation management module 330A of the mobile edge platform MEP_A (as shown in FIG. 6B) (S618) to complete the handover of the UE context among the MEPs once. The above message sequence from FIG. 6A to FIG. 6C may be repeatedly executed each time it is necessary to switch the UE context of the cross-MEPs.

In some embodiments, since the service that needs to be migrated may not be directly used and can't be directly used for updating due to that it is not being enabled, the controller 220 of the MEP 200 may first determine whether the service is enabled, and if it is determined that the service is not enabled, starts the service. In one embodiment, before updating the integrated UE context into the virtual machine of the corresponding service, the mobile edge platform 200 may first detect whether a status of the corresponding service is in an on status or an off status, and determine whether to perform a starting operation to start the corresponding service based on the detected status of the corresponding service. In response to detecting that the status of the corresponding service is in the off status, it indicates that the corresponding service has not been started, and thus the MEP 200 performs a starting operation to start the corresponding service and then updates the corresponding UE context after the corresponding service is started. In another embodiment, the MEP 200 may receive a service status inquiry request from the neighboring MEP, detect whether a status of the corresponding service is in an on status or an off status in response to the service status inquiry request, perform a starting operation to start the corresponding service in response to detecting that the status of the corresponding service is in the off status, and transmit a migration response request message to the neighboring MEP after the starting operation is completed to enable the neighboring MEP to transmit the aforementioned difference data. In another embodiment, when the MEP 200 is a source MEP, the controller 220 may transmit a service status inquiry request to the target neighboring MEP via the communication device 210, and receive a migration response request message which indicates that the corresponding service has been started from the target neighboring MEP via the communication device 210, and transmit the difference data to the neighboring MEP in response to the migration response request message via the communication device 210.

Figure 7:
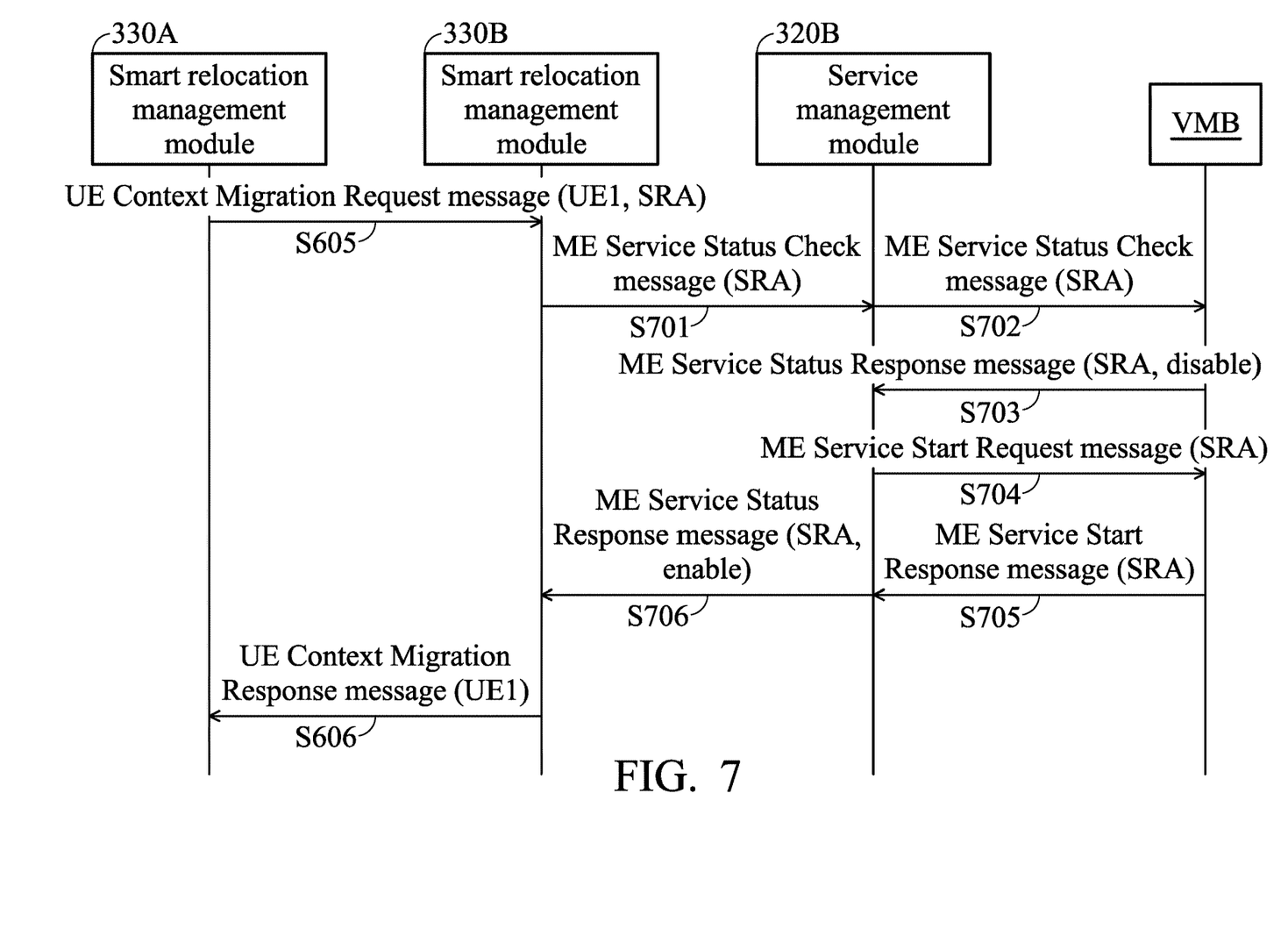
FIG. 7 is a message sequence chart illustrating the procedure for the difference data migration of UE contexts together with a service status query on a target mobile edge platform according to an embodiment of the application.

FIG. 7 is a message sequence chart illustrating the procedure for the difference data migration of UE contexts together with a service status query on a target MEP MEP_B according to an embodiment of the application. Please refer together to FIGS. 6A~6C and FIG. 7.

When the smart relocation management module 330B receives the UE Context Migration Request message at least including the UE identifier (UE1) and the MEP service identifier (SRA) from the smart relocation management module 330 (as shown in S605 of FIG. 6B), the smart relocation management module 330B sends a service status inquiry request message (ME Service Status Check message) at least including a MEP service identifier (MEP Service ID) to the service management module 320B (S701). In this embodiment, the MEP service identifier is SRA.

In response to the ME Service Status Check message, the service management module 320B sends a ME Service Status Check message including at least a service identifier (SRA) to the virtual machine VMB (S702).

After receiving the ME Service Status Check message, the virtual machine VMB queries the status of the service corresponding to the service identifier (SRA) and sends to the service management module 320B a ME Service Status Response message at least including the service identifier (SRA) and a service status (Status) information according to the queried status result (S703). Among them, the service status information of a service can be set as "enable" or "disable", respectively, to indicate that whether the service is in an on or off status.

In this embodiment, assuming that the status data of the service SRA is set to be "disable", it indicates that the service SRA is not enabled/activated, the service management module 320B sends to the virtual machine VMB a ME Service Start Request message that includes at least a service identifier (SRA) to enable/start the service SRA in the virtual machine VMB (S704).

After the virtual machine VMB completes the starting operation corresponding to the service indicated by the service identifier, it sends the ME Service Start Response message including at least the service identifier (SRA) to the service management module 320B to inform the service management module 320B that the starting operation of the service has been completed (S705). The service management module 320B then sends a ME Service Status Response message including at least the service identifier SRA and the status information of "enable" to the smart relocation management module 330B (S706). After the smart relocation management module 330B receives the above-mentioned ME Service Status Response message, it determines that the service SRA to be migrated has been started according to its status information ("enable"), and then sends a UE Context Migration Response message including at least the UE identifier (UE1) (as shown in S606 of FIG. 6B), and continues subsequent operation flow for the subsequent steps shown in FIGS. 6A~6C.

Thus, the MEP servers applied to the mobile edge computing network and UE context migration management methods applied to the mobile edge platform thereof of the application can calculate only partial UE contexts needed to be moved and transmitted when the user is moving and engaged in MEP access switching, thus enabling quickly migration of services needed, reducing migration time and enhancing overall system performance.

Methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

It should be noted that, the terms "first," "second," and so forth in the appended claims, are used merely as labels, and are not intended to impose any numerical requirements, any time order, priority order, or other relationship on the described elements, but rather are used to distinguish between different elements with the same name.

While the application has been described by way of example and in terms of exemplary embodiment, it is to be understood that the application is not limited thereto. Those who are skilled in this technology can still make various alterations and modifications without departing from the scope and spirit of this application. For example, the systems and methods described in the embodiments of the present APPLICATION may be implemented in physical embodiments of hardware, software, or a combination of hardware and software. Therefore, the scope of the present application shall be defined and protected by the following claims and their equivalents.

What is claimed is:

1. A user equipment (UE) context migration management method applied to a mobile edge platform for managing a UE context of a mobile communication device, the method comprising:
   receiving at least one migration request of the UE context;
   calculating a first difference data corresponding to the UE context in response to the at least one migration request, wherein the first difference data represents a difference between the UE contexts obtained in two consecutive UE context retrieving operations corresponding to the at least one migration request; and
   transmitting the first difference data to at least one neighboring mobile edge platform to request the neighboring mobile edge platform to perform a migration operation of the UE context based on the first difference data,
   wherein the mobile edge platform connects to the neighboring mobile edge platform and wirelessly connects to the mobile communication device.

2. The UE context migration management method as claimed in claim 1, further comprising:
   receiving a first UE context from the neighboring mobile edge platform;
   receiving a second difference data from the neighboring mobile edge platform;
   generating a second UE context by performing a merge calculation on the second difference data and the first UE context; and
   updating the second UE context to a virtual machine of a corresponding service.

3. The UE context migration management method as claimed in claim 2, further comprising, before updating the second UE context to the virtual machine of the corresponding service:
   detecting whether a status of the corresponding service is in an on status or an off status; and
   performing a starting operation to start the corresponding service in response to detecting that the status of the corresponding service is in the off status services.

4. The UE context migration management method as claimed in claim 2, further comprising:
   deleting the second difference data after the second UE context is updated to the virtual machine of the corresponding service.

5. The UE context migration management method as claimed in claim 2, further comprising:
   receiving a service status inquiry request from the neighboring mobile edge platform;
   detecting whether a status of the corresponding service is in an on status or an off status in response to the service status inquiry request;
   performing a starting operation to start the corresponding service in response to detecting that the status of the corresponding service is in the off status; and
   transmitting a migration response request message to the neighboring mobile edge platform after the starting operation is completed to enable the neighboring mobile edge platform to transmit the second difference data.

6. The UE context migration management method as claimed in claim 1, further comprising:
   receiving a deleting request from the neighboring mobile edge platform; and
   deleting the first difference data in response to the deleting request.

7. The UE context migration management method as claimed in claim 1, further comprising:
   transmitting a service status inquiry request to the neighboring mobile edge platform;
   receiving a migration response request message from the neighboring mobile edge platform, wherein the migration response request message indicates that the corresponding service has been started; and
   transmitting the first difference data to the neighboring mobile edge platform in response to the migration response request message.

8. The UE context migration management method as claimed in claim 1, further comprising transmitting a UE context migration request message to the neighboring mobile edge platform, wherein the UE context migration request message includes identifier information about the corresponding service and the mobile communication device.

9. A mobile edge platform server, applied to a mobile edge computing network, comprising:
   a mobile edge platform, comprising:
   a communication device configured to perform signal transmission and reception with at least one neighboring mobile edge platform and wireless transmission and reception with a mobile communication device; and
   a controller configured to receive at least one migration request related to a UE context of the mobile communication device via the communication device, calculate a first difference data corresponding to the UE context in response to the at least one migration request, and transmit the first difference data to the neighboring mobile edge platform via the communication device to request the neighboring mobile edge platform to perform a migration operation of the UE context based on the first difference data,
   wherein the first difference data represents a difference between the UE contexts obtained in two consecutive UE context retrieving operations corresponding to the at least one migration request.

10. The mobile edge platform server as claimed in claim 9, further comprising at least one virtual machine, wherein the controller is configured to receive a first UE context from the neighboring mobile edge platform via the communication device, receive a second difference data from the neighboring mobile edge platform via the communication device, generate a second UE context by performing a merge calculation on the second difference data and the first UE context, and update the second UE context to the virtual machine of a corresponding service.

11. The mobile edge platform server as claimed in claim 10, wherein before updating the second UE context to the virtual machine of the corresponding service, the controller further detects whether a status of the corresponding service is in an on status or an off status and performs a starting operation to start the corresponding service in response to detecting that the status of the corresponding service is in the off status services.

12. The mobile edge platform server as claimed in claim 10, wherein the controller further deletes the second difference data after the second UE context is updated to the virtual machine of the corresponding service.

13. The mobile edge platform server as claimed in claim 10, wherein the controller further receives a service status inquiry request from the neighboring mobile edge platform via the communication device, detects whether a status of the corresponding service is in an on status or an off status in response to the service status inquiry request, and performs a starting operation to start the corresponding service in response to detecting that the status of the corresponding service is in the off status, and after the starting operation is completed, the controller further transmits a migration response request message to the neighboring mobile edge platform via the communication device to enable the neighboring mobile edge platform to transmit the second difference data.

14. The mobile edge platform server as claimed in claim 9, wherein the controller further receives a deleting request from the neighboring mobile edge platform via the communication device and deletes the first difference data in response to the deleting request.

15. The mobile edge platform server as claimed in claim 9, wherein the controller further transmits a service status inquiry request to the neighboring mobile edge platform via the communication device and receives a migration response request message from the neighboring mobile edge platform via the communication device, wherein the migration response request message indicates that the corresponding service has been started, and transmits the first difference data to the neighboring mobile edge platform via the communication device in response to the migration response request message.

16. The mobile edge platform server as claimed in claim 9, wherein the controller further transmits a UE context migration request message to the neighboring mobile edge platform via the communication device, wherein the UE context migration request message includes identifier information about the corresponding service and the mobile communication device.

* * * * *